United States Patent
Shi et al.

(10) Patent No.: US 11,134,151 B1
(45) Date of Patent: *Sep. 28, 2021

(54) SYSTEMS AND METHODS FOR IDENTIFYING A BEHAVIORAL TARGET DURING A CONVERSATION

(71) Applicant: CRESTA INTELLIGENCE INC., San Francisco, CA (US)

(72) Inventors: Tianlin Shi, Menlo Park, CA (US); Peter Elliot Schmidt-Nielsen, Menlo Park, CA (US); Navjot Matharu, San Francisco, CA (US); Alexander Donald Roe, San Francisco, CA (US); JungHa Lee, Sunnyvale, CA (US); Syed Zayd Enam, San Francisco, CA (US)

(73) Assignee: CRESTA INTELLIGENCE INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/135,364

(22) Filed: Dec. 28, 2020

Related U.S. Application Data

(63) Continuation of application No. 16/944,718, filed on Jul. 31, 2020, now Pat. No. 10,965,811, which is a (Continued)

(51) Int. Cl.
| | |
|---|---|
| *H04M 3/51* | (2006.01) |
| *G06N 3/08* | (2006.01) |
| *G06Q 10/06* | (2012.01) |
| *G06N 20/00* | (2019.01) |
| *H04M 3/523* | (2006.01) |

(52) U.S. Cl.
CPC ............ *H04M 3/5175* (2013.01); *G06N 3/08* (2013.01); *G06N 20/00* (2019.01); *G06Q 10/06393* (2013.01); *G06Q 10/06395* (2013.01); *G06Q 10/06398* (2013.01); *H04M 3/5232* (2013.01); *H04M 2203/402* (2013.01)

(58) Field of Classification Search
None
See application file for complete search history.

(56) References Cited

U.S. PATENT DOCUMENTS

| 10,586,237 | B2 | 3/2020 | Coughlin et al. |
| 10,708,424 | B1 | 7/2020 | Maestas |

(Continued)

*Primary Examiner* — Nafiz E Hoque
(74) *Attorney, Agent, or Firm* — Invoke

(57) ABSTRACT

A conversation may be monitored in real time using a trained machine learning model. This real-time monitoring may detect attributes of a conversation, such as a conversation type, a state of a conversation, as well as other attributes that help specify a context of a conversation. Contextually appropriate behavioral targets may be provided by machine learning model to an agent participating in a conversation. In some embodiments, these "behavioral targets" are identified by applying a set of rules to the contemporaneously identified conversation attributes. The behavioral targets may be defined in advance prior to the start of a conversation. In this way, the machine learning model may be trained to associate particular behavioral target(s) with one or more conversation attributes (or collections of attributes). This facilitates the real-time monitoring of a conversation and contemporaneous guidance of an agent with machine-identified behavioral targets.

17 Claims, 9 Drawing Sheets

Related U.S. Application Data continuation of application No. 16/836,831, filed on Mar. 31, 2020, now abandoned.

(56) References Cited

U.S. PATENT DOCUMENTS

| | | | |
|---|---|---|---|
| 2011/0010173 A1 | 1/2011 | Scott et al. | |
| 2011/0033036 A1* | 2/2011 | Edwards | G06Q 30/02 |
| | | | 379/265.09 |
| 2014/0140497 A1* | 5/2014 | Ripa | H04M 3/5133 |
| | | | 379/265.06 |
| 2015/0195406 A1* | 7/2015 | Dwyer | G06F 21/6254 |
| | | | 379/265.07 |
| 2015/0256677 A1* | 9/2015 | Konig | H04M 3/5233 |
| | | | 379/265.09 |
| 2015/0264177 A1* | 9/2015 | Feast | H04M 3/5175 |
| | | | 379/265.07 |
| 2020/0143288 A1 | 5/2020 | Eisenzopf | |

* cited by examiner

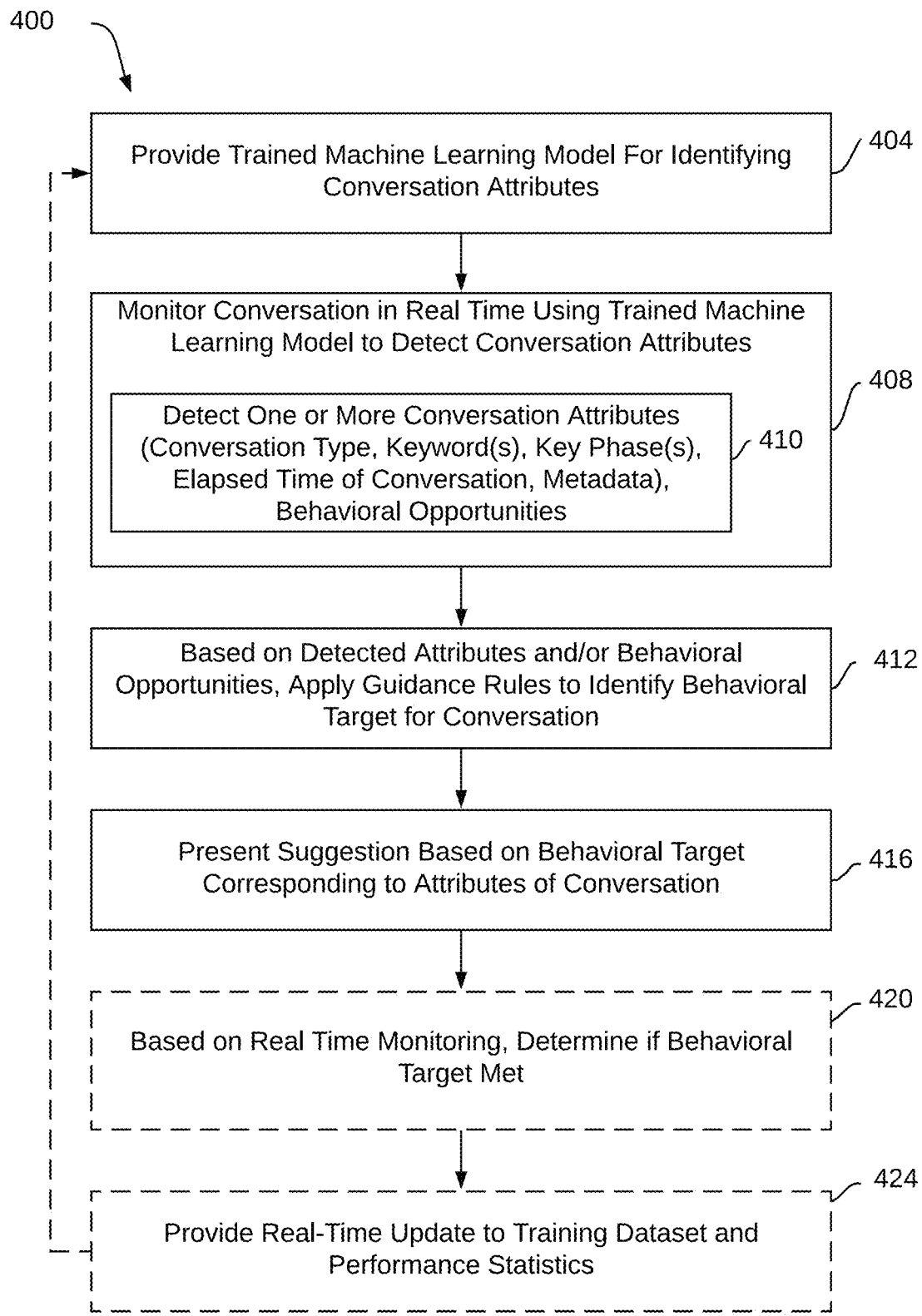

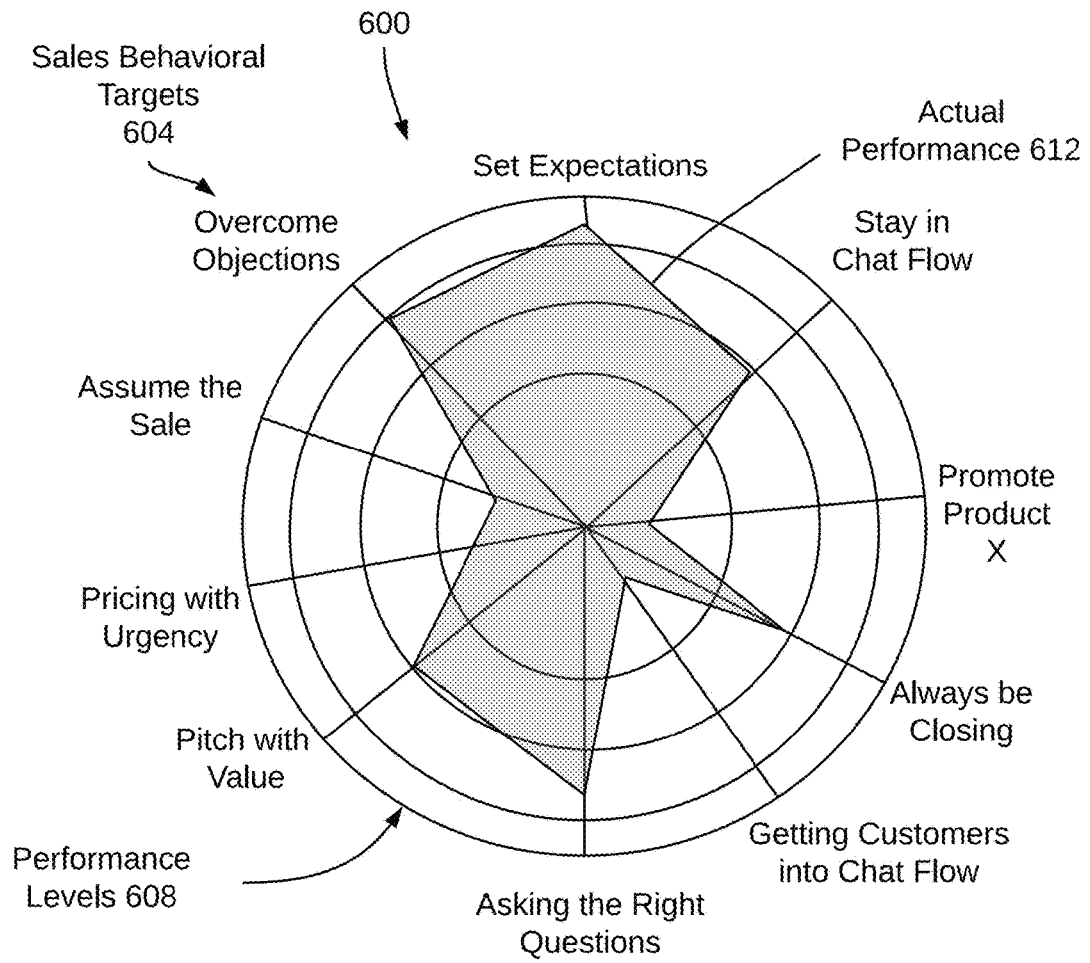

SYSTEMS AND METHODS FOR IDENTIFYING A BEHAVIORAL TARGET DURING A CONVERSATION

Each of the following applications are hereby incorporated by reference: application Ser. No. 16/944,718 filed on Jul. 31, 2020; application Ser. No. 16/836,831 filed on Mar. 31, 2020. The Applicant hereby rescinds any disclaimer of claim scope in the parent application(s) or the prosecution history thereof and advises the USPTO that the claims in this application may be broader than any claim in the parent application(s).

TECHNICAL FIELD

The present disclosure relates to real-time analysis of conversations. In particular, the present disclosure relates to systems and methods for using machine learning models for contemporaneous analysis of a conversation and for identifying a behavioral target in a conversation using machine learning models.

BACKGROUND

In a variety of contexts, customer support functions (e.g., sales, marketing, complaint resolution, informational query) may rely on any of a variety of tools to improve the quality and speed of interactions with customers. For example, agents in a call center may have paper or electronically stored scripts that may be used inappropriate circumstances. Text chats maybe facilitated by the use of "pills" that allow standard responses to be provided to an inquiring party simply by selecting the pill containing the appropriate response.

Despite uniform scripts and convenient response mechanisms, the current suite of tools used by most call centers can be inadequate. Responses maybe labor intensive and time consuming, the effectiveness of many agents maybe low leading to dissatisfied customers, and generally agent turnover is high.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates example operations of a method for training and using a machine learning model to provide behavioral targets for, and contemporaneously with, a conversation, in accordance with some embodiments;

FIG. 6A illustrates an example performance measurement display that includes behavioral targets for a sales conversation and agent performance for each behavioral target, in accordance with some embodiments;

FIG. 6B illustrates an example performance measurement display that includes behavioral targets for a sales conversation and agent performance for each behavioral target as a function of time, in accordance with some embodiments;

DETAILED DESCRIPTION

Figure 1:
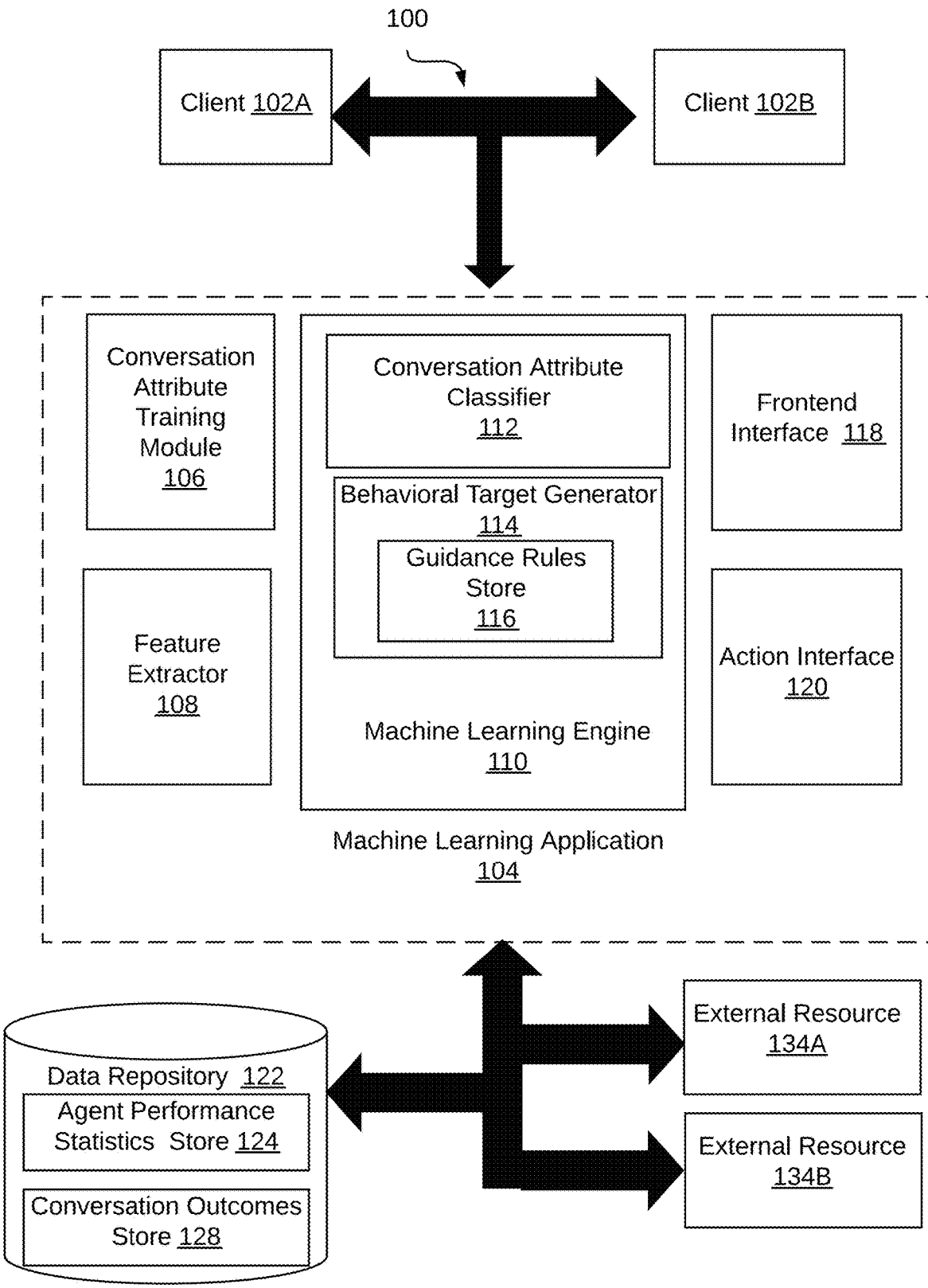
FIG. 1 illustrates a conversation analysis system, in accordance with some embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1.0 GENERAL OVERVIEW
2.0 SYSTEM ARCHITECTURE
3.0 CONVERSATION FLOW ILLUSTRATIONS
4.0 PROVIDING BEHAVIORAL TARGETS AND IDENTIFYING BEHAVIORAL OPPORTUNITIES
5.0 COMPUTER NETWORKS AND CLOUD NETWORKS
6.0 MICROSERVICE APPLICATIONS
7.0 HARDWARE OVERVIEW
8.0 MISCELLANEOUS; EXTENSIONS 1.0 General Overview In addition to the challenges of call centers identified above, another challenge is the difficulty in identifying techniques that effectively resolve issues presented by a caller. This difficulty is due in part to the high volume of call traffic and the unpredictable nature of conversation. Even upon identifying effective techniques, communication of effective techniques throughout a call center is often limited to updating scripts that are read (or written in a text chat) by agents. Merely updating a script is often insufficient for improving an effectiveness of an agent. This is because a technique may be effective when provided at a particular time and/or within a particular conversational context. A phrase that effectively resolves an issue at one time and/or in one conversational context may be unhelpful or counterproductive for a different caller in a different conversational context. Explaining the possible contexts in which a technique may be helpful to train others is too time consuming and difficult to be used effectively as a training technique.

In one or more techniques of the present disclosure, a conversation may be monitored in real time using a trained machine learning model. This real-time monitoring (equivalently referred to as "contemporaneous monitoring") of a conversation may detect attributes of a conversation. These attributes may include a conversation type (e.g., sales, help, complaint, general inquiry, product support), a state of a conversation (e.g., corresponding to states of the "sales funnel," an elapsed time), metadata associated with a conversation, as well as other attributes that help specify a context of a conversation. A collection of attributes may collectively be referred to as a "conversation state." Having the trained machine learning model determine conversation attributes in real time with the conversation enables the machine learning model to contemporaneously identify and provide contextually appropriate behaviors for an agent participating in a conversation. In some embodiments, these "behavioral targets" are identified by applying a set of rules to the contemporaneously identified conversation attributes. The behavioral targets may be defined in advance prior to the start of a conversation. In this way, the machine learning model may be trained to associate particular behavioral target(s) with one or more conversation attributes (or collections of attributes). This facilitates the real-time monitoring of a conversation and contemporaneous guidance of an agent with machine-identified behavioral targets.

A behavioral target may be provided by the system so that an agent is notified of an objective within a conversation to be accomplished by one or more statements of the agent. Examples of behavioral targets may correspond to acknowledging the difficulties presented by a caller, responding to objections raised by a caller, emphasizing value of a product, or providing reducing pricing to a caller concerned about cost. A conversation, which may move through multiple states, may have one or more behavioral targets corresponding to each state. In some examples, behavioral targets guide an agent in the type of response, but do not necessarily provide a script to follow. In other words, a behavioral target includes statements that may guide an agent as to the type of action or response most appropriate for the current conversational context in light of the ultimate goal of the conversation (e.g., closing a sale, resolving a technical issue, remedying a complaint). For example, behavioral targets described in some embodiments herein may indicate that an agent should attempt to establish a better emotional connection with a caller, emphasize value of a product, or begin negotiating price. These high-level goals presented by the trained machine learning model can be provided more accurately and more consistently than is otherwise possible for a population of human agents operating solely based on their individual experience and expertise levels, which may vary widely. In other words, techniques described herein may provide experienced-based guidance to steer and/or respond appropriately in real time, regardless of the actual experience level of a recipient of the guidance. While some examples described below include the presentation of a behavioral target itself, other examples include presenting a suggestion or prompt based on the behavioral target. This suggestion may not include the behavioral target itself but may instead guide the user toward the behavioral target with a suggested or recommended statement. For example, a user may be guided to a behavioral target of "pricing with urgency" by suggestions like "offer a discount," "he is price-sensitive," or "cut a deal." In some examples, these suggestions may prompt or guide the user toward the preferred behavior rather than providing a script to be followed verbatim or nearly verbatim.

Furthermore, the system may be configured to detect behavioral opportunities within a conversation. Because of the real-time analysis enabled by machine learning, systems and methods described below may determine whether a behavioral target has already been met without notification of the agent by the system. If the system contemporaneously detects that an agent has met a behavioral target, then the system may refrain from providing the behavioral target to the agent. Conversely, the behavioral target may be provided if the system determines that the agent has not performed an action corresponding to the behavioral target.

2.0 System Architecture

FIG. 1 illustrates a conversation analysis system 100 in accordance with one or more embodiments. In the embodiment shown, the conversation analysis system 100 includes clients 102A, 102B, a machine learning (ML) application 104, a data repository 122, and external resources 134A, 134B. In one or more embodiments, the system 100 may include more components than those illustrated in FIG. 1. The components illustrated in FIG. 1 may be local to or remote from other components used by the system 100. The components illustrated in FIG. 1 may be implemented in software and/or hardware and may be distributed over one or more applications and/or machines. Operations described with respect to the components illustrated in FIG. 1 may be instead performed by one or more other components.

In some embodiments, ML application 104 provides components through which conversations can be monitored and analyzed in real time (i.e., contemporaneous with the conversation) based on a real-time analysis of the conversation state (e.g., one or more attributes of the conversation). Based on this analysis, previously defined behavioral targets can be identified that are responsive and appropriate to the conversation context. As indicated above, providing these previously defined behavioral targets to agents in real time enables any agent, regardless of experience level or aptitude, to interact in a conversation as though very experienced and very proficient.

The components of the ML application 104 may include a conversation attribute training module 106, a feature extractor 108, an ML engine 110, a frontend interface 118, and an action interface 120. However, as previously indicated the components of system 100, including ML application 104 may vary depending on the particular implementation.

In some embodiments, conversation attribute training module 106 receives a set of electronic documents as input (i.e., a training corpus). Examples of electronic documents include, but are not limited to, electronically stored transcriptions of conversations and/or electronically recorded conversations. The conversation attribute training module 106 further receives one or more labels for each conversation as input.

In some examples, a label associated with a conversation in the training corpus may identify a behavioral target as desirable within a particular context of a conversation. It will be appreciated that any portion of a conversation in a training corpus may labeled so that a single conversation may include multiple labels as the conversation moves through various conversational states between being start and finish.

Continuing with the sales conversation example presented above, if a training corpus conversation includes a first phrase of "this is too expensive," this first phrase may be associated with a label corresponding to one behavioral target of "recognize objections." It may alternatively or additionally be labeled with another label corresponding to another behavioral target of "pricing with urgency." An agent, contemporaneously prompted by these behavioral targets (or a suggestion based on a behavioral target) in a call would then be able to respond appropriately (e.g., "I understand your concerns, let me give you a promotion to try it out").

The conversation attribute training module 106 may be in communication with clients 102A, 102B. If one of the clients 102A, 102B is an interface used by agents to communicate, the other illustrated agent 102A, 102B may be used to apply labels to the conversation concurrently with conversations. Alternatively, labels may be applied via one of the clients 102A, 102B in stored conversations and used to train the machine learning application 104 offline.

In some embodiments, feature extractor 108 is configured to identify feature values and generate feature vectors from labeled conversation input documents (whether textual or audio). The feature extractor 108 may tokenize words and phrases in a training corpus into vocabulary tokens. The feature extractor 108 may then generate feature vectors that include a sequence of values, with each value representing a different vocabulary token (e.g., term frequency feature vectors, term-frequency/inverse document frequency feature vectors). The labels assigned to words and phrases in the training corpus documents may then be associated with corresponding feature vectors.

The feature extractor 108 may append other features to the generated feature vectors. In one example, a feature vector may be represented as $[f_1, f_2, f_3, f_4]$, where $f_1, f_2, f_3$ correspond to tokens and where $f_4$ is a non-vocabulary feature. Example non-vocabulary features may include, but are not limited to, a total duration of a conversation, an elapsed time of conversation or conversation state, among others.

The ML engine 110 is configured to automatically learn, from the conversation attribute training module 106 and the feature extractor 108, conversational attributes leading to particular outcomes and to generate behavioral targets for new (i.e., "target") conversations. As indicated above, these behavioral targets may be provided to a user contemporaneously with the target conversation. The ML engine 110 includes, in the example shown, a conversation attribute classifier 112 and a behavioral target generator 114.

The conversation attribute classifier 112 is component of the machine learning application 104 that is configured for identifying attributes of target conversations (i.e., contemporaneously analyzed conversations not in the training corpus). The conversation attribute classifier 112 may receive feature vectors from the feature extractor 108 of conversations in the training corpus analyzed and labeled in the conversation attribute training module 106. The conversation attribute classifier 112 may execute ML training algorithms to build a trained ML model also stored in the conversation attribute classifier 112. A trained ML model may then be used to contemporaneously identify attributes of a conversation. Example ML training algorithms and ML models include, but are not limited to, supervised learning algorithms (e.g., neural networks).

The behavioral target generator 114 receives attributes from the conversation attribute classifier 112 for a target conversation and generates a behavioral target associated with the identified attributes. A set of one or more behavioral targets associated with one or more conversation attributes may be defined in advance of any conversation (e.g., via the various aspects of machine learning described above) and stored in the behavioral target generator 114. In this way, a particular conversation or portion of a conversation may be characterized by the conversation attribute classifier and a behavioral target selected contemporaneously with the conversation.

Associations between stored behavioral targets and conversation attributes may be stored in the guidance rules store 116. In one embodiment, a plurality of guidance rules that are stored in the guidance rules store 116 may associate various combinations of keywords, key phrases, elapsed time of a conversation, conversation metadata, and/or conversation types with one or more behavioral targets. In one embodiment, the guidance rules store 116 stores a plurality of associations between conversation attributes and behavioral targets (conveniently referred to as "guidance rules") that are global to all users of the system 100. These global guidance rules can be formed based on ML training algorithms that use conversation(s) from any user as a training corpus. In some examples, the trained ML model itself analyzes conversation attributes and/or receives attributes from the conversation attribute classifier 112 and produces behavioral targets based on the operation of the model. In one embodiment, the guidance rules store 116 stores guidance rules that are particular to each user or stores a machine learning model that may provide behavioral targets particular to each user. In this case, at least a portion of the training corpus includes conversations that are specific to the user receiving behavioral targets. The labeled training corpus corresponding to a particular user may also be used in cooperation with a user attribute profile. The user attribute profile may include the industry in which the agent works, the product types or product lines the agent works with, the type of calls the agent typically deals with (sales, help, product support, complaints), performance metrics associated with call types, behavioral targets, efficiency, productivity, success rate, and others. Using conversations for the training corpus associated with a particular user enables training specific to that user, thus personalizing the analysis and guidance for that particular user. In other examples, a combination of global and user-specific guidance rules can be stored in the guidance rule store 116.

In some examples, conversation characteristics may be used to select rules from the rules store 116. In some examples, conversation characteristics may be provided to a trained machine learning model that processes the attributes to provide a behavioral target. One example of a conversation characteristic is that of a product being discussed. A product profile may be stored and used with any of the preceding aspects to select rules or otherwise inform a machine learning model for the provision of behavioral targets. For example, the training corpus may be used to identify behavioral targets that successfully resolve many issues for a particular product. This profile may be accessed along with any of the foregoing to select rules or be provided to a machine learning model. Conversation characteristics that include industry type, a product line, and customer profiles (e.g., for frequent callers or corporate clients in business to business interactions) may be used to select rules or inform a machine learning model to guide the selection of behavioral targets.

Guidance rules can be selected from the guidance rules store 116 by using one or more of an agent (i.e., user) profile, particular areas of low performance (e.g., selecting rules that emphasize the provision of behavioral targets in areas of low agent performance), as well as a product profile (e.g., emphasizing the provision of behavioral targets identified in the training corpus as successful for a particular call type, product, industry).

Guidance rules can be selected using any of the foregoing factors. The factors may be weighted using an expected (i.e., statistical probability) success rate that correlates one or more of the rule selection criteria with successful resolution of a call. The foregoing factors may also be used to inform a machine learning model.

The conversation attribute classifier 112 and the behavioral target generator 114 can cooperate in the real-time analysis of a conversation so that behavioral targets are not presented when not needed. For example, if a particular conversation exhibits attributes that would suggest a behavioral target in which a discounted price to a caller, the real-time analysis can detect if the agent has mentioned a discount to the caller. If this behavioral target has been met by a statement from the agent without being provided by the system, the system will note this and not provide the already completed behavioral target.

Frontend interface 118 manages interactions between ML application 104 and clients 102A, 102B. For example, a client may submit requests to perform various functions and view results through frontend interface 118. A client in this context may be a human user, such as a system administrator, or another application, such as a shell or client application. In some examples, a client 102A, 102B is an interface used by an agent to communicate with another party (e.g., a caller or text correspondent).

In some embodiments, frontend interface 118 is a presentation tier in a multitier application. Frontend interface 118 may process requests received from clients, such as clients 102A, 102B, and translate results from other application tiers into a format that may be understood or processed by the clients. Frontend interface 118 may be configured to render user interface elements and receive input via user interface elements. For example, frontend interface 118 may generate webpages and/or other graphical user interface (GUI) objects. Client applications, such as web browsers, may access and render interactive displays in accordance with protocols of the internet protocol (IP) suite. Additionally or alternatively, frontend interface 118 may provide other types of user interfaces comprising hardware and/or software configured to facilitate communications between a user and the application. Example interfaces include, but are not limited to, GUIs, web interfaces, command line interfaces (CLIs), haptic interfaces, and voice command interfaces. Example user interface elements include, but are not limited to, checkboxes, radio buttons, dropdown lists, list boxes, buttons, toggles, text fields, date and time selectors, command lines, sliders, pages, and forms.

In some embodiments, action interface 120 provides an interface for executing actions using computing resources, such as external resources 134A, 134B. Action interface 120 may include an API, CLI, or other interfaces for invoking functions to execute actions. One or more of these functions may be provided through cloud services or other applications, which may be external to ML application 104. For example, one or more components of system 100 may invoke an API to access a conversation stored in data repository 122 for use as a training document for the machine learning application 104. As another example, an API in the action interface 120 may access communication systems used by agents and callers (or text chat correspondents) so as to execute real-time analysis of the conversations. It will be appreciated considering these examples that the actions that are performed may vary from implementation to implementation.

In some embodiments, external resources 134A, 134B are network services that are external to ML application 104. Example cloud services may include, but are not limited to, social media platforms, email services, short messaging services, enterprise management systems, verbal communication systems (e.g., internet based voice communications, text chat communications, POTS communications systems) and other cloud applications. Action interface 120 may serve as an API endpoint for invoking a cloud service. For example, action interface 120 may generate outbound requests that conform to protocols ingestible by external resources 134A, 134B. Action interface 120 may process and translate inbound requests to allow for further processing by other components of ML engine 110. Action interface 120 may store, negotiate, and/or otherwise manage authentication information for accessing external resources 134A, 134B. Example authentication information may include, but is not limited to, digital certificates, cryptographic keys, usernames, and passwords. Action interface 120 may include authentication information in the requests to invoke functions provided through external resources 134A, 134B.

In some embodiments, ML application 104 is a cloud service, such as a software-as-a-service (SaaS) or a web service. Clients, such as clients 102A, 102B, may be a web browser, mobile application, or other software application communicatively coupled to a network. A client may interact with cloud services using one or more communication protocols, such as HTTP and/or other communication protocols of the Internet Protocol (IP) suite. In other embodiments, ML application 104 may be locally accessible to a user, such as a desktop or other standalone application.

In one or more embodiments, the system 100 may include or more data repositories 122. A data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site.

A data repository, such as the data repository 122 shown, may be implemented or may execute on the same computing system as the machine learning application 104. The data repository 122 may be communicatively coupled to the machine learning application 104 via a direct connection or via a network.

The example data repository 122 includes two data partitions: agent performance statistics store 124 and conversation outcomes store 128. The agent performance statistics store 124 records data associated with the performance of individual agents. For example, data may include high level performance measurements such as a number of conversations conducted during different time periods (e.g., a day, a month, a quarter), a breakdown of the types of calls conducted (e.g., product support, sales, complaint), and a proportion of the conversations that were concluded successfully (e.g., question answered, sale completed, complaint resolved). The agent performance statistics store 124 may also include more specific performance measurements indicating the types of behavioral targets that should have been provided by an agent during a conversation, a proportion of each type provided by an agent without the target being provided by the system, a proportion of each type provided by the system, and a sub-proportion indicating whether the agent actually performed the behavioral target provided by the system. Each of these measurements can be monitored over time so that areas of high performance, low performance, and improvement can be identified for each agent.

In some examples the machine learning engine 110 may adapt the frequency with which particular behavioral targets are provided based on performance statistics for individual agents stored in the agent performance statistics store 124. For areas of high performance (e.g., in which an agent performed a desired behavior without the behavioral target being provided by the system), the machine learning engine 110 may decrease a frequency at which the particular behavioral target is provided to that agent or increase a time between when a set of attributes is detected and a behavioral target is provided (to allow time for the agent to spontaneously engage in the targeted behavior). For areas of low performance (e.g., in which an agent fails to spontaneously exhibit behavior consistent with a particular behavioral target and/or fails to perform a behavior even upon provision of a behavioral target), the frequency of behavioral target provisioning can be increased. In another example, the machine learning engine 110 can operation through frontend interface 118 to increase the visual prominence of a provided behavioral target on a client 102A, 102B used by the agent to interact with a caller or text chat correspondent.

3.0 Conversation Flow Illustrations

Figure 2:
FIG. 2 illustrates various possible pathways for a single example conversation, thus illustrating the unpredictability of a conversation, in accordance with some embodiments.

As indicated above, one challenge to operating a call center and providing training to agents is the unpredictable nature of conversations. While a conversation may have an expected starting point (facilitated by, e.g., selections from a phone tree), a conversation may have any of a number of conclusions and follow any of a number of conversational paths to the conclusion. FIG. 2 illustrates an example conversation and the many possible variations within it.

As shown, a sales agent may initiate an expected sales call in row 204 with the phrase "Thank you for inquiring about that product. Can I sign you up today?" Four different possible responses form the caller are shown in row 208, illustrating a first level of variability in a conversation. As illustrated in the row 208, the caller may request more information generally, request more specific information (i.e., cost), agree to purchase the product, or redirect the call to another product that is different from the product initially requested in row 204.

Row 212 indicates example corresponding agent responses to the caller statements in row 208.

While the conversation elements between rows 208 and 212 are illustrated as having a 1 to 1 correspondence, the responses illustrated in row 216 may follow any of the conversation elements from row 212, with the exception of the conclusion of the sale ("Here you go. Thanks. <END.>"). In other words, three of the four conversation elements illustrated in the row 212 may lead to any of the four conversation elements in row 216. This illustrates one aspect of conversation flow variability.

This variability is compounded in the row 220, in which three of the conversation elements in the row 216 may lead to four of the five conversation elements in the row 220. The possible conversation flow paths from the row 212 to the row 216, compounded with the possible conversation flow paths from the row 216 to the row 220 illustrate the unpredictability and variability inherent in conversations.

To improve characterization and ML model predictions, conversations can be characterized as progressing through various states. One or more behavioral targets can be associated with a subset of these states. In some examples, behavioral targets can be provided corresponding to the state and also provided with a goal of guiding a conversation to a successive state. Example states and corresponding example phrases for different conversation types are illustrated in FIG. 3.

As shown in this example, a conversation may be classified (operation 304) as belonging to a particular conversation type upon initiating the conversation. In the example shown, the conversation types include a sales conversation, a help conversation, or a complain conversation. Identifying the type of conversation may occur with the assistance of a phone tree selection as well as using machine learning techniques to identify keywords or phrases that are indicative of the conversation type. In the example shown, the conversation type is identified by agent responses show in operation 304.

Figure 3:
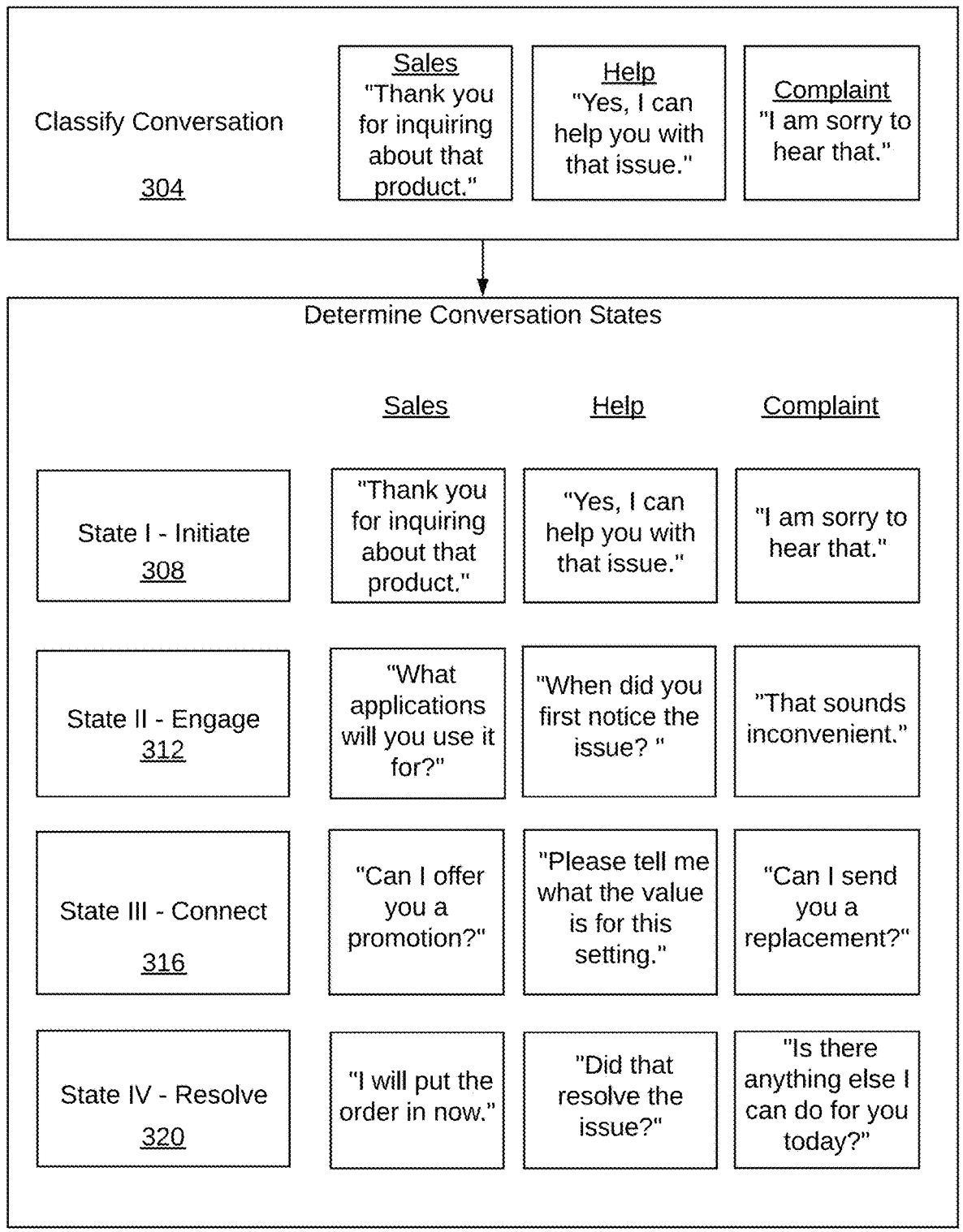
FIG. 3 illustrates example conversational states of a conversation, in accordance with some embodiments.

Example conversational states are illustrated as operations 308, 312, 316, and 320 in FIG. 3. In some examples, conversation states may be identified based on keywords, key phrases, an elapsed time of a conversation, among other factors. These factors, along with the type of conversation may be considered "attributes" of a conversation. Some embodiments of the systems and techniques described herein may identify these attributes, use the identified attributes to further identify behavioral opportunities in the conversation, and provide (if needed) a corresponding behavioral target.

FIG. 3 illustrates agent responses for each of four states. For example, a first state 308 of a conversation may be broadly characterized as an "initiation" state in which an agent first engages with a caller to address an issue. A second state 312 may be broadly characterized as an "engagement" state in which an agent seeks further details from a caller. A third state 316 may be broadly characterized as a "connection" state in which an agent seeks even more information from a caller and begins to explore different options for addressing an issue. The "connection" state may also be characterized as the agent expressing interest in the issue presented by the caller. A fourth state 320 may be broadly characterized as the "resolution" state in which an agent provides a solution to the issue presented by the caller.

As mentioned above, keywords, key phrases, an elapsed time, conversation state, and conversation type may all be considered attributes of a conversation. Conversation states themselves may also be identified using the type and other attributes of a conversation. Conversation states may also be used with guidance rules to provide behavioral targets.

4.0 Providing Behavioral Targets and Identifying Behavioral Opportunities

As mentioned above, because a conversation may follow an unpredictable path and the timing and context of a response are vital to successfully concluding a conversation, techniques described herein use real time analysis of a conversation to provide high level guidance to an agent during a conversation. Some of these techniques identify behavioral opportunities within a conversation and corresponding behavioral targets. These behavioral opportunities and corresponding behavioral targets are not merely a script that an agent is instructed to follow. Instead, the real time machine learning analysis identifies attributes of the conversation so that an agent may be guided to perform a desired behavior at an opportune time. In some examples, the actual content (text or speech) of the behavioral target may be left to the agent.

Figure 5A:
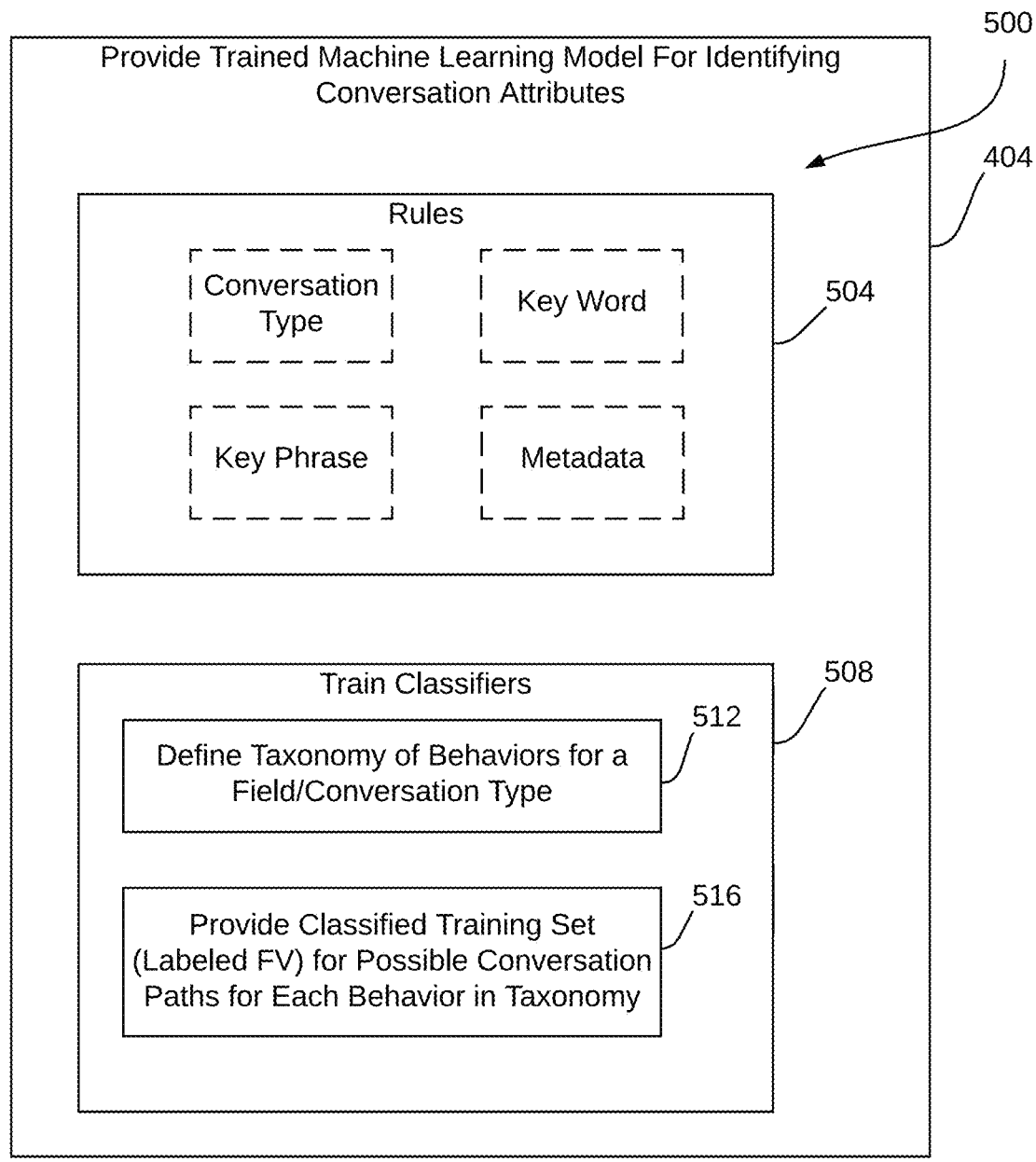
FIG. 5A illustrates example operations for training a machine learning algorithm to identify conversational attributes, in accordance with some embodiments.

FIG. 4 illustrates an example method 400 for identifying behavioral opportunities in a conversation in one example. The method 400 may begin by providing a trained machine learning model that has been trained to identify conversation attributes (operation 404). Example details of the operation 404 are shown in FIG. 5A in the context of a method 500. For example, training a machine learning algorithm to identify conversation attributes may include one or both of rules (operation 504) and trained classifiers (operation 508). Rules (or a machine learning model) may associate one or more of conversation type(s) (e.g., sales, help, product support, complaint, general inquiry), keyword(s), key phrase(s), conversation metadata, and/or an elapsed time of a conversation with one or more corresponding behavioral targets. For example, keywords such as "buy," "cost," "delivery," may be associated with a behavioral target of "assuming the sale" in a sales call. Key phrases such as "too much," "lower price," "competitor's product" may be associated with behavioral targets such as "pricing with urgency" and "pitch with value." Similarly, keywords and phrases such as "help," "buy," "how," and "doesn't work" may be associated with the attribute of a conversation type (e.g., product support, sales, help, complaint, respectively). An elapsed time or ranges of elapsed times of a conversation may also be used to define a conversation attribute associated with a conversation state (such as those illustrated in FIG. 3). Conversation metadata may also be used to determine attributes of a conversation. Examples of conversation metadata include a shopping history, browsing history, shopping cart content, customer relationship management data, among others. These may be converted to feature vectors using natural language processing, among other techniques.

Machine learning models may also be trained using classifiers (operation 508). In the example illustrated in FIG. 5A, the training has two elements. First, one or more training sets of conversations corresponding to different conversation types (e.g., sales, help, complaint, product support) are each analyzed to define a taxonomy of behaviors corresponding to each type (operation 512). In some examples, stored conversations (whether voice calls, text chats, or other forms of stored conversation) are labeled as part of the analysis.

The labels may be of two general types. A first type of label may be used on words, phrases, or interactions between a caller and an agent to indicate a behavioral opportunity. A behavioral opportunity is a precursor to a behavioral target. That is, a behavioral opportunity is associated with a state of a conversation where one or more corresponding behavioral targets may be appropriately completed by performing one or more actions. For example, if a caller indicates hesitation about the price of a product in a sales call (e.g., "that seems too expensive," or "I will need to discuss it with my spouse," or "that is more than I thought it would cost") this may be labeled as a price sensitivity behavioral opportunity. Frustration or an escalation of frustration in a help desk call (e.g., "this still isn't working," "it should just work," "you need to replace this right now") may be labeled a behavioral opportunity that corresponds to any de-escalating behavioral target on the part of the agent.

A second type of label may label responses in a stored training conversation as appropriate behavioral targets. For example, an agent offering a discount in response to price sensitivity may be labeled with the behavioral target labels "price with urgency." In another example, an agent emphasizing product features in response to price sensitivity ("that is more than I thought it would cost") may be labeled with the behavioral target of "pitch with value." In still another example, an agent expressing understanding and sympathy with the frustration of a caller in a help call may be labeled with the behavioral target of "empathize and calm."

The training sets for the various conversation types may then be vectorized and the vectors (and associated labels) used to train machine learning classifiers. These classifiers may then be deployed to train a machine learning model.

Returning to FIG. 4, the trained machine learning model may be used to monitor a conversation in real time (i.e., the monitoring is contemporaneous with the conversation itself) (operation 408). The monitoring may detect conversation attributes, including conversation type, keywords, key phrases, and/or elapsed time, among other attributes. The trained machine learning model may also detect behavioral opportunities.

Based on detected conversation attributes and/or behavioral opportunities identified by the machine learning model, a behavioral target may be identified upon application of guidance rules (operation 412). In some examples, the guidance rules map one or more attributes and/or behavioral opportunities to one or more behavioral targets. For example, price sensitivity expressed by a caller may be mapped to one or more guidance rules that include "pitch with value," "price with urgency," and "overcome objections." Specific attributes identified by the trained machine learning model and/or rules may be used to emphasize one or more of the behavioral targets associated with the guidance rules.

Figure 5B:
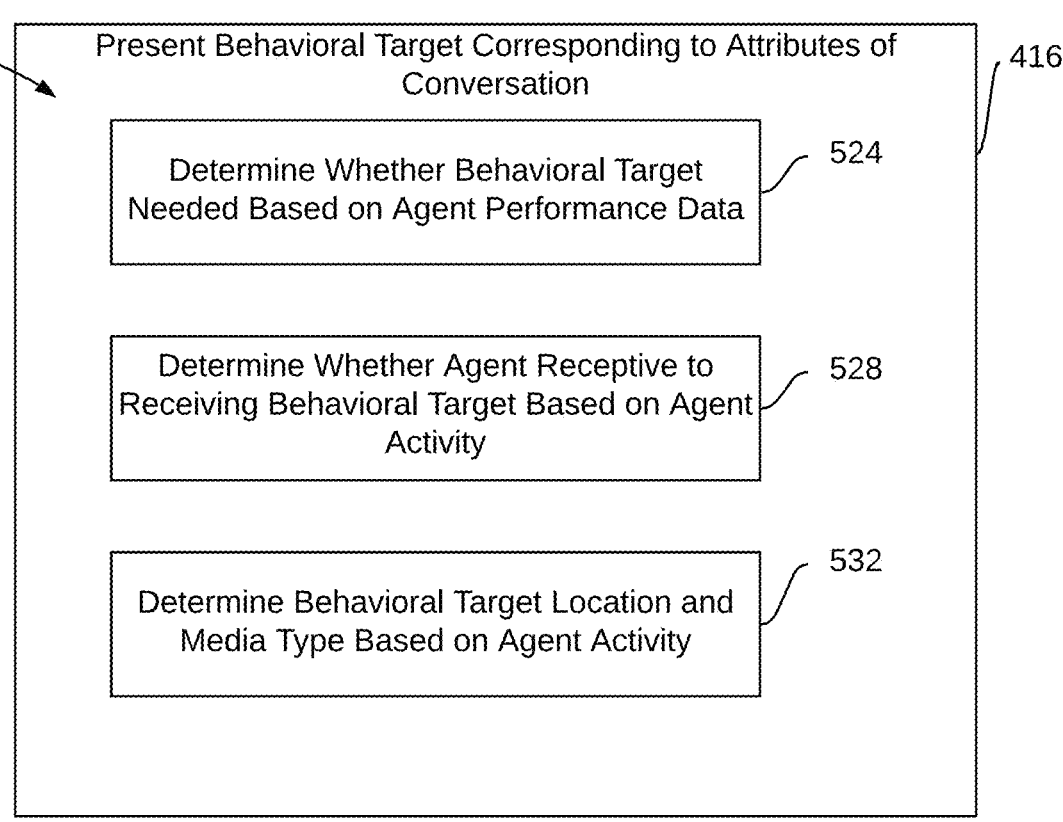
FIG. 5B illustrates example operations for presenting a behavioral target corresponding to attributes contemporaneously identified during a conversation, in accordance with some embodiments.

The one or more behavioral targets corresponding to these attributes may be presented to an agent (operation 416). FIG. 5B illustrates an optional process in which presentation of a behavioral target to an agent may be modified. In this example method 520, one or more criteria may be detected to determine whether, when, and/or where a behavioral target is to be provided to an agent. For example, performance data for a particular agent for a particular set of conversation attributes and/or behavioral targets may be used to determine whether or not a behavioral target will be provided to an agent (operation 524). If a particular agent successfully and/or proactively overcomes objections or asks the right questions, then corresponding behavioral targets need not be provided. Conversely, if a particular agent does not proactively price with urgency, then a corresponding behavioral target may be provided. Another criteria that may affect presentation of a behavioral target is whether an agent is receptive to receiving a behavioral target based on agent activity (operation 528). For example, an agent activity level may be monitored through a user interface. Example activity level metrics include a character type rate, a mouse movement distance (or distance/unit time), a rate of speech (number of words/unit time), a number of windows or chat sessions open on the agent's user interface, among others. If the agent is actively typing, moving or opening windows, and/or talking (e.g., above a threshold rate), then the system may wait until the activity level decreases relatively (e.g., by 10%) or below a threshold (fewer than 50 characters/minute) before providing a behavioral target. In this way the behavioral target is provided at a time when an agent is more likely to be receptive to it. A third criteria is to identify a location within a user interface (e.g., on a screen) where the agent is most active (operation 532). A behavioral target may be provided in a region of a user interface that the agent is not actively using or is actively using to either avoid disrupting the work of the agent or to ensure that the behavioral target is seen by the agent, respectively. Any one or more of these determinations may be used to tailor providing a behavioral target to an agent.

In some cases, because of the contemporaneous monitoring described above, the system may determine that a behavioral target was met or is being met during the conversation upon the agent performing one or more actions equal to or above a threshold number of actions (operation 420). Alternatively, the threshold number may be based on a number of completed actions (e.g., proportional to the number of completed actions, a ratio of completed actions divided by total detected opportunities). If the behavioral target has already been met by the agent, without the system presenting the behavioral target, then the system may note that the target has been met. In this case, the system will not unnecessarily provide the behavioral target to the agent. This has the added benefit of not distracting an agent already engaging in the desired behaviors. In some examples, the system may provide a confirmation or affirmation to the agent of successful completion of a behavioral target. If the system determines that the behavioral target has not already been met and does provide the target, the system will continue real time monitoring to determine if the agent performs actions that do meet the behavioral target (operation 420). Performance statistics may be updated based on whether the agent has performed an action that meets the behavioral target (operation 424). Similarly, the training dataset may also be updated to include data from contemporaneously monitored conversations (operation 424). For example, the importance of particular behavioral targets may be learned based on real-time analysis of conversations. The importance of some behavioral targets to successfully resolving a conversation (or conversation type) maybe emphasized (or weighted) in the machine learning model. Those behavioral targets that are less important to successfully resolving a conversation, based on the updates to the training set of conversations, may be weighted less.

FIG. 6A illustrates an example agent performance chart 600, in one embodiment. The performance chart 600 includes, in this example, various sales behavioral targets 604 arrayed around a circumference of a circular graph. Within the circular graph are rings indicating performance levels 608. An agent's actual performance with regard to each of the indicated sales behavioral targets is indicated by shaded region 612. Better performance is indicated by shading further from the origin (center) of the graph and closer to the outermost performance ring 608 of the graph 600. In this case, the agent performs well on setting expectations, overcoming objections and asking the right questions. In light of the above description, these behavioral targets may be provided less frequently to the agent given the high performance values. In this example, the agent has low performance regarding the promotion of products, getting customers into a chat flow, and assume the sale. Accordingly, behavioral targets may be provided more frequently and/or more prominently when corresponding behavioral opportunities are identified.

FIG. 6B illustrates an example agent performance chart 616 that tracks agent performance per behavioral target as a function of time (in this case, week number). In this chart, darker shading indicates more severe non-compliance with behavioral targets. In this case, the agent's performance for "assume the sale" has improved from week 1 to week 5. The agent's performance for "pitch with value" declines from week 1 to week 2, but then improved thereafter. The agent's performance was mostly steady for "always be closing" from week 1 to week 5. It will be appreciated that performance metrics, whether in the forms depicted in FIGS. 6A and 6B or some other form (e.g., a table of ratios, a stoplight chart) may be presented for review (e.g., by supervisory staff).

Figure 7:
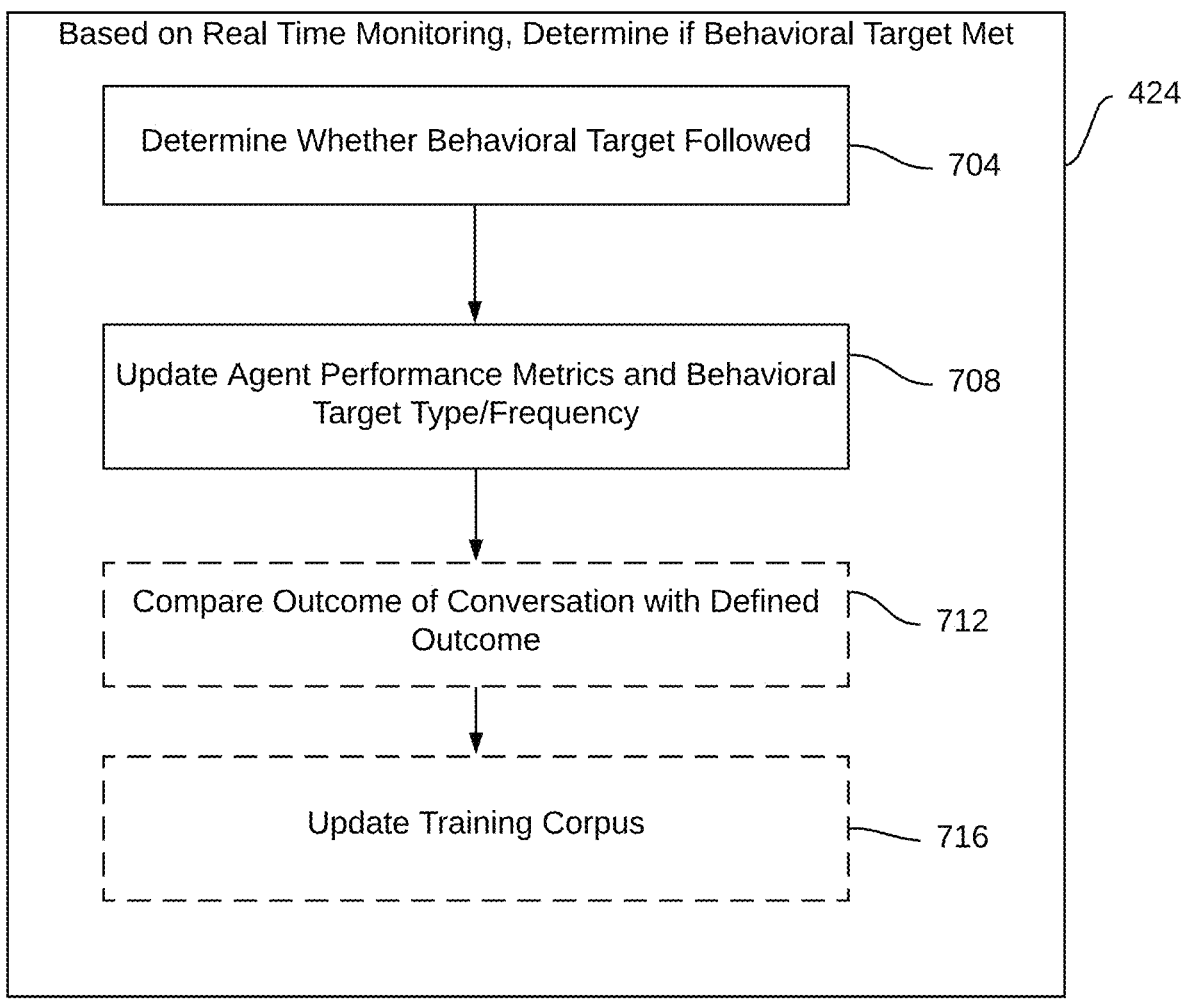
FIG. 7 illustrates example operations for monitoring, in real-time, whether a behavioral target has been met, in accordance with some embodiments.

FIG. 7 illustrates an example 700 of operations for real time monitoring of a conversation to determine if a behavioral target has been met (operation 424). Based on the contemporaneous monitoring of a conversation, the system can determine whether an agent has acted in a way that indicates the behavioral target has been followed (operation 704). This may be accomplished using any of the machine learning model techniques indicated above (e.g., using a trained machine learning model and/or rule based monitoring). A performance profile for an agent may then be updated to reflect whether or not the behavioral target was met (operation 708). The performance profile can include both absolute numbers of followed behavioral targets as well as a ratio of followed behavioral targets to provided behavioral targets and/or a ratio of followed behavioral targets to behavioral opportunities. In some examples, a performance profile may be based on a ratio of a number of prompts followed during a conversation divided by a total number of prompts provided. Upon conclusion of a conversation, an outcome of the conversation can be compared with a predefined desired outcome (operation 712). If the outcome of the conversation is favorable (e.g., a sale is completed, a problem resolved), then the conversation can be analyzed, labeled, and added to the training dataset so as to improve the training of the machine learning model by expanding the data in the training dataset (operation 716). Similarly, if the outcome of the conversation is not favorable (e.g., no sale, no problem resolution), the conversation can be analyzed for behaviors that were not helpful, and similarly added to the training dataset of the machine learning model (operation 716).

5.0 Computer Networks and Cloud Networks

In some embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In some embodiments, a client may be local to and/or remote from a computer network. The client may access the computer network over other computer networks, such as a private network or the Internet. The client may communicate requests to the computer network using a communications protocol, such as HTTP. The requests are communicated through an interface, such as a client interface (such as a web browser), a program interface, or an API.

In some embodiments, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In some embodiments, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In some embodiments, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In some embodiments, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In some embodiments, in a multi-tenant computer network, tenant isolation is implemented to ensure that the applications and/or data of different tenants are not shared with each other. Various tenant isolation approaches may be used.

In some embodiments, each tenant is associated with a tenant ID. Each network resource of the multi-tenant computer network is tagged with a tenant ID. A tenant is permitted access to a particular network resource only if the tenant and the particular network resources are associated with a same tenant ID.

In some embodiments, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In some embodiments, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In some embodiments, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

6.0 Microservice Applications

According to some embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HTTP messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In some embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to some embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally, or alternatively, the target microservice may be connected to one or more other microservices such that an alert is input to the other microservices. Other microservices may perform responsive actions based on the above techniques, including, but not limited to, deploying additional resources, adjusting system configurations, and/or generating GUIs.

Actions

In some embodiments, a plugged-in microservice application may expose actions to the microservices manager. The exposed actions may receive, as input, data or an identification of a data object or location of data, that causes data to be moved into a data cloud.

In some embodiments, the exposed actions may receive, as input, a request to increase or decrease existing alert thresholds. The input might identify existing in-application alert thresholds and whether to increase or decrease or delete the threshold. Additionally, or alternatively, the input might request the microservice application to create new in-application alert thresholds. The in-application alerts may trigger alerts to the user while logged into the application or may trigger alerts to the user using default or user-selected alert mechanisms available within the microservice application itself, rather than through other applications plugged into the microservices manager.

In some embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

7.0 Hardware Overview

According to some embodiments, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 8:
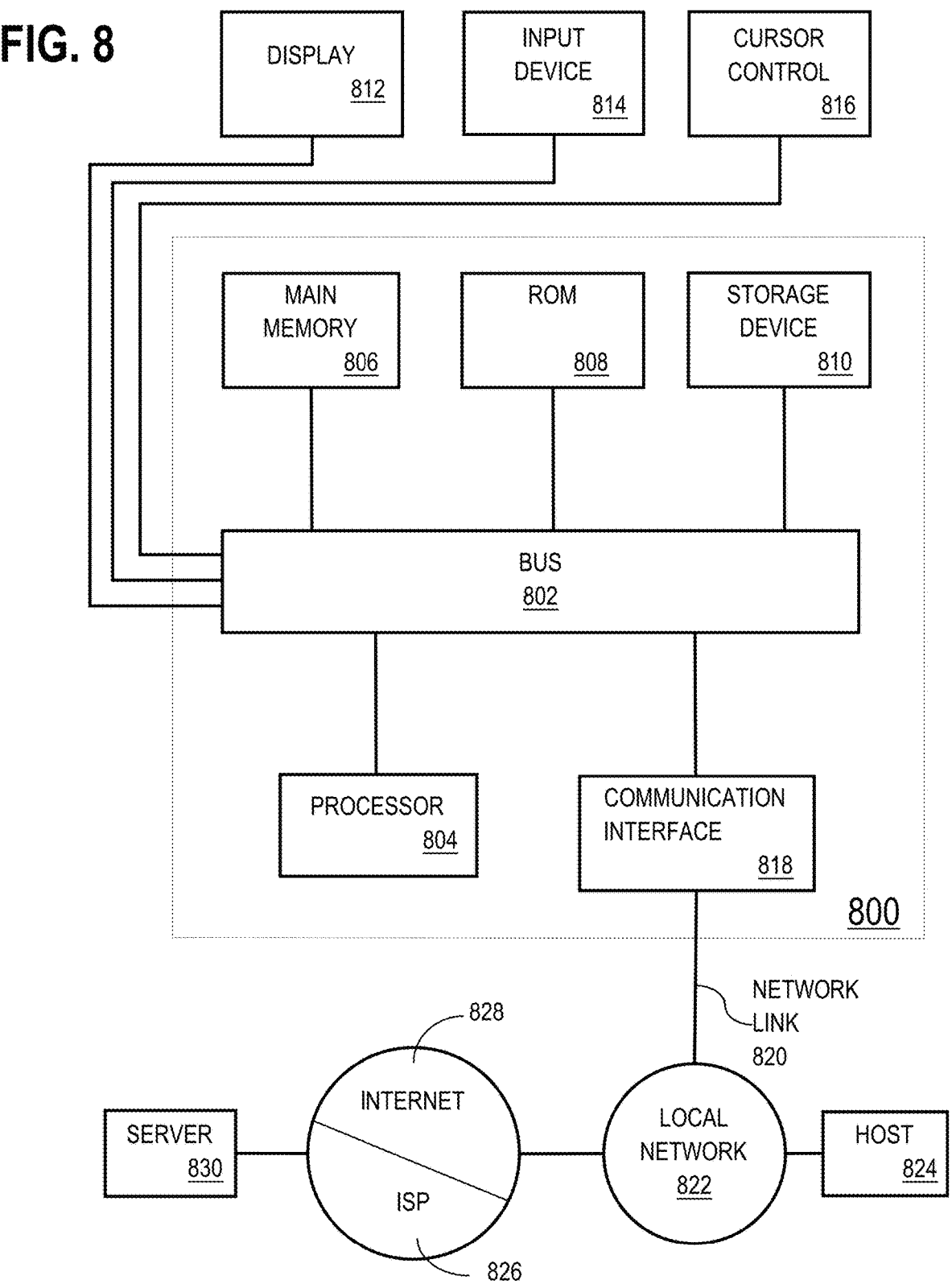
FIG. 8 shows a block diagram that illustrates a computer system in accordance with one or more embodiments.

For example, FIG. 8 is a block diagram that illustrates computer system 800 upon which some embodiments may be implemented. Computer system 800 includes bus 802 or other communication mechanism for communicating information, and a hardware processor 804 coupled with bus 802 for processing information. Hardware processor 804 may be, for example, a general purpose microprocessor.

Computer system 800 also includes main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes read only memory (ROM) 808 or other static storage device coupled to bus 802 for storing static information and instructions for processor 804. Storage device 810, such as a magnetic disk or optical disk, is provided and coupled to bus 802 for storing information and instructions.

Computer system 800 may be coupled via bus 802 to display 812, such as a cathode ray tube (CRT) or light emitting diode (LED) monitor, for displaying information to a computer user. Input device 814, which may include alphanumeric and other keys, is coupled to bus 802 for communicating information and command selections to processor 804. Another type of user input device is cursor control 816, such as a mouse, a trackball, touchscreen, or cursor direction keys for communicating direction information and command selections to processor 804 and for controlling cursor movement on display 812. Input device 814 typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 810. Volatile media includes dynamic memory, such as main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid state drive of a remote computer. The remote computer can load the instructions into its dynamic memory and send the instructions over a network line, such as a telephone line, a fiber optic cable, or a coaxial cable, using a modem. A modem local to computer system 800 can receive the data on the network line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the worldwide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

8.0 Miscellaneous; Extensions

Embodiments are directed to a system with one or more devices that include a hardware processor and that are configured to perform any of the operations described herein and/or recited in any of the claims below.

In some embodiments, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer-readable media storing instructions, which when executed by one or more hardware processors, cause performance of operations comprising:
    monitoring a first conversation to detect a first set of attributes of the first conversation in real-time;
    based on the first set of attributes of the first conversation, applying a first set of guidance rules to the detected first set of attributes of the first conversation to identify a first behavioral target for the first conversation, wherein applying the first set of guidance rules to the detected first set of attributes comprises determining a first current conversation state based on the first set of attributes of the first conversation;
    determining that a first performance value for a first agent associated with the first conversation meets a threshold performance value;
    responsive to determining that the first performance value for the first agent associated with the first conversation meets the threshold performance value, refraining from presenting a first suggestion;
    monitoring a second conversation to detect a second set of attributes of the second conversation in real-time;
    based on the second set of attributes of the second conversation, applying a second set of guidance rules to the detected second set of attributes of the second conversation to identify a second behavioral target for the second conversation, wherein applying the second set of guidance rules to the detected second set of attributes comprises determining a second current conversation state based on the second set of attributes of the second conversation;
    determining that a second performance value for a second agent associated with the second conversation does not meet the threshold performance value;
    responsive to determining that the second performance value for the second agent does not meet the threshold performance value, presenting a second suggestion based on the second behavioral target corresponding to the attributes of the second conversation; and
    wherein the second performance value is based on a second rate at which the second agent proactively applied a second statement corresponding to at least one of: (a) the second behavioral target in a second set of prior conversations having the second behavioral target or (b) the second suggestion in the second set of prior conversations having the second behavioral target.

2. The media of claim 1, wherein the first suggestion and the second suggestion comprise one or more of a prompt or a recommended statement for guiding a corresponding one of the first conversation and the second conversation toward an ultimate target conclusion.

3. The media of claim 1, wherein:
    the first performance value is based on a first rate at which the first agent proactively applied a first statement corresponding to the first suggestion in a first set of prior conversations having the first behavioral target.

4. The media of claim 1, wherein:
    the first performance value is based on a first rate at which the first agent proactively applied a first statement corresponding to the first behavioral target in a first set of prior conversations having the first behavioral target.

5. The media of claim 1, further comprising responsive to determining that the second performance value for the second agent does not meet the threshold performance value, presenting the second behavioral target as the suggestion.

6. The media of claim 1, wherein the first conversation is associated with a sales call and the first behavioral target is associated with completing a sale.

7. A method comprising:
    monitoring a first conversation to detect a first set of attributes of the first conversation in real-time;
    based on the first set of attributes of the first conversation, applying a first set of guidance rules to the detected first set of attributes of the first conversation to identify a first behavioral target for the first conversation, wherein applying the first set of guidance rules to the detected first set of attributes comprises determining a first current conversation state based on the first set of attributes of the first conversation;
    determining that a first performance value for a first agent associated with the first conversation meets a threshold performance value;
    responsive to determining that the first performance value for the first agent associated with the first conversation meets the threshold performance value, refraining from presenting a first suggestion;
    monitoring a second conversation to detect a second set of attributes of the second conversation in real-time;
    based on the second set of attributes of the second conversation, applying a second set of guidance rules to the detected second set of attributes of the second conversation to identify a second behavioral target for the second conversation, wherein applying the second set of guidance rules to the detected second set of attributes comprises determining a second current conversation state based on the second set of attributes of the second conversation;
    determining that a second performance value for a second agent associated with the second conversation does not meet the threshold performance value;
    responsive to determining that the second performance value for the second agent does not meet the threshold performance value, presenting a second suggestion based on the second behavioral target corresponding to the attributes of the second conversation; and
    wherein the second performance value is based on a second rate at which the second agent proactively applied a second statement corresponding to at least one of: (a) the second behavioral target in a second set of prior conversations having the second behavioral target or (b) the second suggestion in the second set of prior conversations having the second behavioral target.

8. The method of claim 7, wherein the first suggestion and the second suggestion comprise one or more of a prompt or a recommended statement for guiding a corresponding one of the first conversation and the second conversation toward an ultimate target conclusion.

9. The method of claim 7, wherein:
the first performance value is based on a first rate at which the first agent proactively applied a first statement corresponding to the first suggestion in a first set of prior conversations having the first behavioral target.

10. The method of claim 7, wherein:
the first performance value is based on a first rate at which the first agent proactively applied a first statement corresponding to the first behavioral target in a first set of prior conversations having the first behavioral target.

11. The method of claim 7, further comprising responsive to determining that the second performance value for the second agent does not meet the threshold performance value, presenting the second behavioral target as the suggestion.

12. The method of claim 7, wherein the first conversation is associated with a sales call and the first behavioral target is associated with completing a sale.

13. A system comprising:
at least one device including a hardware processor;
the system being configured to perform operations comprising:
monitoring a first conversation to detect a first set of attributes of the first conversation in real-time;
based on the first set of attributes of the first conversation, applying a first set of guidance rules to the detected first set of attributes of the first conversation to identify a first behavioral target for the first conversation, wherein applying the first set of guidance rules to the detected first set of attributes comprises determining a first current conversation state based on the first set of attributes of the first conversation;
determining that a first performance value for a first agent associated with the first conversation meets a threshold performance value;
responsive to determining that the first performance value for the first agent associated with the first conversation meets the threshold performance value, refraining from presenting a first suggestion;
monitoring a second conversation to detect a second set of attributes of the second conversation in real-time;
based on the second set of attributes of the second conversation, applying a second set of guidance rules to the detected second set of attributes of the second conversation to identify a second behavioral target for the second conversation, wherein applying the second set of guidance rules to the detected second set of attributes comprises determining a second current conversation state based on the second set of attributes of the second conversation;
determining that a second performance value for a second agent associated with the second conversation does not meet the threshold performance value;
responsive to determining that the second performance value for the second agent does not meet the threshold performance value, presenting a second suggestion based on the second behavioral target corresponding to the attributes of the second conversation; and
wherein the second performance value is based on a second rate at which the second agent proactively applied a second statement corresponding to the second behavioral target in a second set of prior conversations having the second behavioral target.

14. The method of claim 13, wherein the first suggestion and the second suggestion comprise one or more of a prompt or a recommended statement for guiding a corresponding one of the first conversation and the second conversation toward an ultimate target conclusion.

15. The method of claim 13, wherein:
the first performance value is based on a first rate at which the first agent proactively applied a first statement corresponding to the first suggestion in a first set of prior conversations having the first behavioral target.

16. The method of claim 13, wherein:
the first performance value is based on a first rate at which the first agent proactively applied a first statement corresponding to the first behavioral target in a first set of prior conversations having the first behavioral target.

17. The method of claim 13, further comprising responsive to determining that the second performance value for the second agent does not meet the threshold performance value, presenting the second behavioral target as the suggestion.

* * * * *